July 17, 1934.  J. W. LEIGHTON  1,966,588
FRONT WHEEL SHOCK ABSORBER FOR MOTOR VEHICLES
Filed Feb. 17, 1934
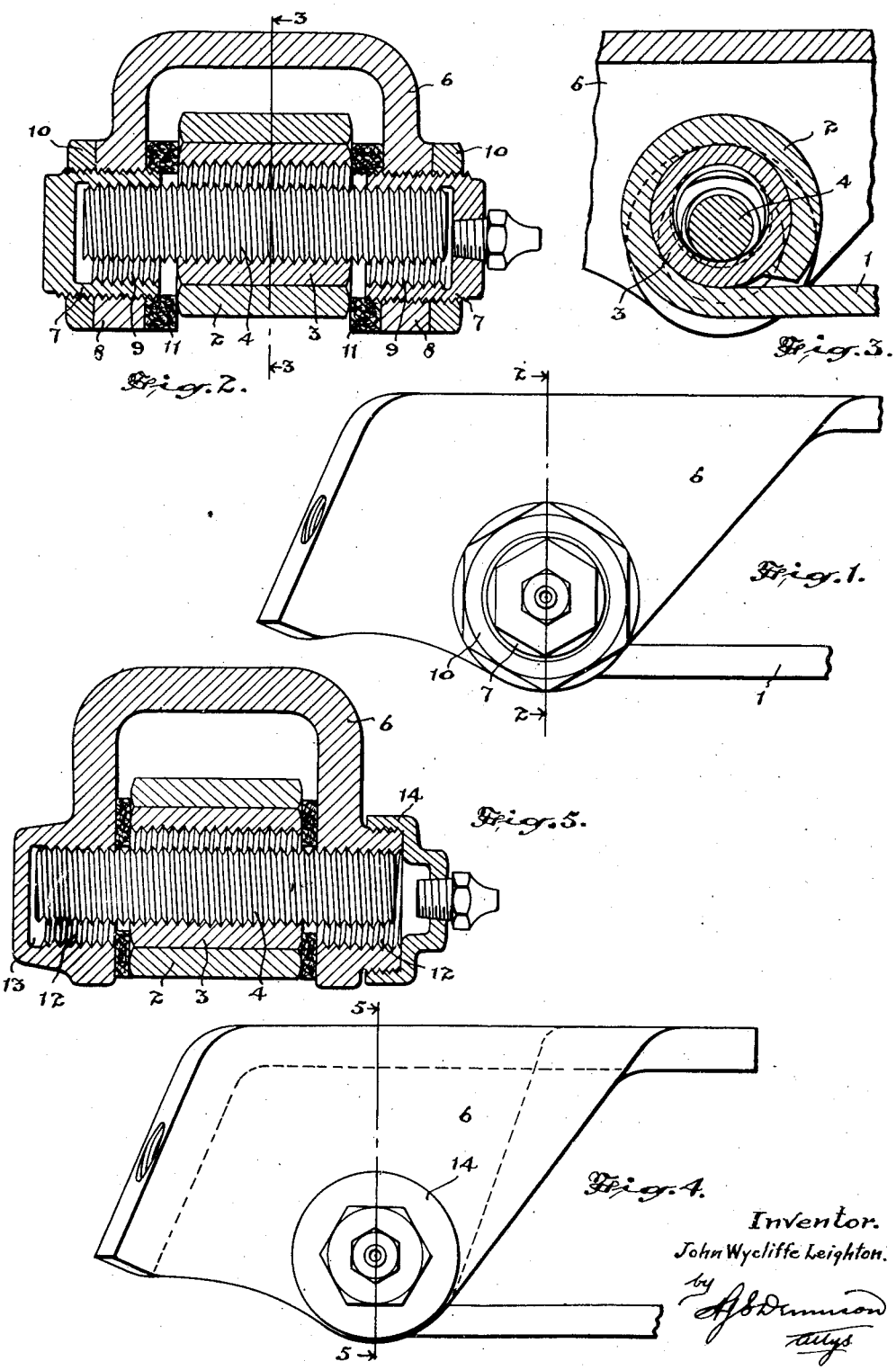
Inventor.
John Wycliffe Leighton.

Patented July 17, 1934

1,966,588

UNITED STATES PATENT OFFICE

1,966,588

FRONT WHEEL SHOCK ABSORBER FOR MOTOR VEHICLES

John Wycliffe Leighton, Port Huron, Mich.

Application February 17, 1934, Serial No. 711,632

6 Claims. (Cl. 267—54)

The principal objects of this invention are to eliminate the vibration of the front wheels of the motor car being transmitted to the steering mechanism and to devise a "kick shackle" of a simple, durable and inexpensive construction which will be self-aligning and self-adjusting and will operate in direct ratio to the weight of the vehicle and its contents.

The principal feature of the invention consists in supporting the vehicle frame from the springs upon a shackle pin which is free to oscillate within bearing orifices in the frame bracket and at the end of the spring so that shocks imparted to the wheel will be absorbed in an oscillatory movement of the support pin, thereby eliminating the transference of such shocks to the frame.

A practical application of this invention is illustrated in the accompanying drawing in which Figure 1 is a side elevational view of a frame end and spring end embodying the present invention.

Figure 2 is a vertical sectional view taken through the line 2—2 of Figure 1.

Figure 3 is a cross sectional view taken through the line 3—3 of Figure 2.

Figure 4 is a side elevation of a slightly modified form of construction.

Figure 5 is a vertical section through the line 5—5 of Figure 4.

In putting this invention into effect the main spring leaf 1 is formed with an eye 2 in which is mounted a bushing 3 which is threaded internally from end to end. Within this threaded bushing is mounted a threaded shackle pin 4, the thread of which is of a corresponding pitch to the thread on the inner side of the bushing, but the diameter of the pin is considerably less than the diameter of the threaded interior of the bushing and said pin rests eccentrically within the bushing orifice as is clearly shown in Figure 3 as well as in Figure 2 of the drawing, the bottom of the pin resting in rolling engagement with the bottom of the threaded surface of the bushing orifice.

The frame bracket 6 which is rigidly secured to the vehicle frame, is shown in Figures 1 and 2 as having a cap bushing 7 threaded into each of the side lugs 8. Said bushings are closed at one end and are formed with internal threaded orifices 9 having a thread of the same pitch as the shackle pin 4, but said orifices are of the same or substantially the same diameter as the threaded orifice of the bushing 3.

The shackle pin engages the upper side of the threaded orifice in the bushings, resting downwardly thereon so that the weight of the vehicle body and all equipment carried thereby bears downwardly upon the ends of the shackle pin and the centre portion of the shackle pin bears downwardly upon the spring bushing, while both centre and end bushings are free to oscillate in relation to the pin. They are, however, held from relative endwise movement by the engaging threads of the shackle pin.

The cap bushings 7 are locked securely in adjusted positions by the lock nut 10 and suitably lubricating fittings are arranged on the outer end.

The inner ends of the bushings 7 are spaced from the end of the spring bushing 3, and suitable dust washers 11 are arranged at the ends of the bushings to engage the spring ends to prevent grit and dirt from entering the bushing orifices and to retain the lubricant therein.

The form shown in Figures 4 and 5 is substantially the same as that shown in Figures 1, 2 and 3 with the exception that the orifices 12 in the frame bracket are threaded to the same pitch as the shackle pin instead of having a bushing. One side of the frame bracket is shown with a blind pocket end 13 and the other side has mounted thereon a sealing cap 14.

It will be appreciated that the weight of the vehicle chassis and the body of load carried thereby rests upon the ends of the shackle pin, projecting beyond the spring bushing, and the pin rests upon the spring bushing which is carried by the spring supported by the axle and wheels, and in the operation of the vehicle when shocks are imparted to the wheels and spring, such shocks are transmitted endwise of the spring to the shackle pin, but as the shackle pin rests eccentrically within the threaded orifice of the spring bushing there will be a relative rolling movement between the two, the pin tending to roll up the inclined walls of the threaded bushing. The shock imparted to the wheels and spring is thus considerably relieved at the shackle pin end of the spring, and the shackle pin in turn rides in its relief movement on the eccentrically disposed walls of the threaded orifices in the lugs thereof or in the threaded bushing or both. Consequently there is a relative movement between the shackle pin and the frame bracket and spring bushing.

The result of both of the loss motion structures is that the severe impact shocks usually transmitted from the front wheels of a motor vehicle to the steering mechanism, are substantially eliminated, consequently the vibration of such shocks is not transmitted to the steering mechanism and the driving of the vehicle is rendered much smoother than would be the case where the shackle pin is directly connected without relief to the spring eye and vehicle frame brackets.

Many devices have been proposed in which a loose oscillating member is cushioned by means of springs. The present invention disposes of all springs and utilizes the weight of the vehicle operating through the eccentrically disposed bearing surfaces to balance and relieve the shocks.

The threaded bearing surfaces of the shackle pin and the bushings effectively hold the frame on the springs from relative lateral displacement.

It will be readily understood that the device is extremely simple in construction and it is very easily and quickly assembled or disconnected.

What I claim as my invention is:—

1. In a front wheel shock absorber for motor vehicles, the combination with the spring having a cylindrical orifice therethrough and a frame having a bracket end spanning said spring at said orifice and having cylindrical orifices therein, of a shackle pin, of considerably smaller diameter than said cylindrical spring and frame bracket orifices, engaging the curved walls thereof in eccentric relation, whereby an arcuate rolling bearing area is maintained at all times between the shackle pin and the spring and bracket orifices to minimize wear while providing for adequate relief displacement.

2. In a front wheel shock absorber for motor vehicles, the combination with the spring end having a threaded transverse orifice and a frame bracket having lugs extending each side of said spring end, of a shackle pin of a lesser diameter than the spring orifice and threaded the same pitch as the thread of said spring orifice, the orifices of said frame bracket having threaded surfaces of the same pitch as the threaded shackle pin and of greater diameter.

3. In a front wheel shock absorber for motor vehicles, the combination with the spring eye end and the vehicle frame bracket straddling same, of a threaded shackle pin eccentrically supported in a threaded orifice in the spring eye and eccentrically engaging threaded orifices in the frame bracket and forming an oscillatable support for the frame.

4. In a front wheel shock absorber for motor vehicles, the combination with the spring eye, of a bushing mounted therein threaded from end to end, a threaded shackle pin having a thread the same pitch but of lesser diameter than the threaded opening in the bushing and engaging the bottom of the threaded opening, threaded orifices being provided in the frame threaded the same pitch as said shackle pin but of larger diameter and having their upper surfaces resting on the upper side of said shackle pin, means for sealing the space between the frame bracket and spring eye, and means for lubricating the threaded bearing surfaces.

5. In a front wheel shock absorber for motor vehicles, the combination with the vehicle spring having an eye end and a bushing therein internally threaded, a shackle pin threaded the same pitch as the internal thread of said bushing but of lesser diameter, said pin extending through and beyond the ends of said bushing and resting in the bottom thereof, bushings mounted in the frame bracket at either side of the spring each having a threaded interior of the same pitch and of larger diameter than said shackle pin, and having the upper surfaces resting upon the upper side of said pin, and means for locking said bushings in adjusted positions on said frame bracket.

6. In a front wheel shock absorber for motor vehicles, the combination with the spring eye end and the vehicle frame bracket straddling same, of a threaded shackle pin eccentrically supported in a threaded orifice in the spring eye and free for rolling or body displacement therein to relieve end shocks on the spring, said shackle pin being retained at the ends against free axial displacement in the frame bracket and the threaded inter-engagement of the shackle pin and spring eye serving to maintain the spring eye spaced from the inner sides of the bracket.

JOHN WYCLIFFE LEIGHTON.